United States Patent
Raetzsch et al.

(10) Patent No.: US 6,242,525 B1
(45) Date of Patent: Jun. 5, 2001

(54) THERMOPLASTIC ELASTOMERS OF HIGH STRENGTH AND ELASTICITY AND OF GOOD DYEABILITY AND POLYMER BLENDS OF HIGH STRENGTH PRODUCED THEREFROM

(75) Inventors: Manfred Raetzsch, Kirchschlag; Achim Hesse, Linz; Norbert Reichelt, Neuhofen; Hartmut Bucka, Eggendorf; Hermann Heinemann, Kematen/Ybbs, all of (AT); Matthias Stolp, Merseburg; Hans-Joachim Radusch, Weissenfels, both of (DE)

(73) Assignee: Borealis GmbH, Schwechat-Mannswoerth (AT)

( * ) Notice: Subject to any disclaimer, the term of this patent is extended or adjusted under 35 U.S.C. 154(b) by 0 days.

(21) Appl. No.: 09/186,520

(22) Filed: Nov. 5, 1998

(30) Foreign Application Priority Data

Nov. 6, 1997 (DE) .............................................. 197 48 976

(51) Int. Cl.$^7$ ............................. C08L 9/00; C08F 279/02; B29D 24/00
(52) U.S. Cl. ......................... 524/525; 524/526; 524/534; 525/263; 525/313; 525/331.7; 428/35.7
(58) Field of Search .................................... 524/526, 534; 525/263, 313, 331.7, 525

(56) References Cited

U.S. PATENT DOCUMENTS

| 4,963,612 | * | 10/1990 | Braga et al. | 524/526 |
| 5,902,858 | * | 5/1999 | Okura et al. | 525/313 |

FOREIGN PATENT DOCUMENTS

97/25356 * 7/1997 (WO) .

* cited by examiner

Primary Examiner—Tae H. Yoon
(74) Attorney, Agent, or Firm—Jordan and Hamburg LLP

(57) ABSTRACT

Thermoplastic elastomers of high strength, high elasticity and good dyeability, the incorporated elastomeric particles of which have an average particle diameter of 0.05 to 5 μm, from propylene homopolymers and/or propylene copolymers, elastomeric $C_2$ to $C_8$ olefin copolymers and/or terpolymers and multifunctional, unsaturated monomers are formed by a method, for which mixtures of propylene homopolymers and/or propylene copolymers, elastomeric $C_2$ to $C_8$ olefin copolymers and/or terpolymers and readily volatile $C_4$ to $C_7$ dienes are reacted in the melt. The thermoplastic elastomers, as well as mixtures with conventional polyolefins, are suitable for use in the vehicle industry, in the domestic appliances industry, in the building sector and in medical technology.

10 Claims, No Drawings

THERMOPLASTIC ELASTOMERS OF HIGH STRENGTH AND ELASTICITY AND OF GOOD DYEABILITY AND POLYMER BLENDS OF HIGH STRENGTH PRODUCED THEREFROM

BACKGROUND OF THE INVENTION

The invention relates to thermoplastic elastomers of high strength and elasticity and of good dyeability and polymer blends of high impact strength produced therefrom, which are suitable for use in the vehicle industry, in the domestic appliances industry and in medical technology. The invention also relates to a method for producing these thermoplastic elastomers.

Thermoplastic elastomers, such as styrene-butadiene block copolymers, thermoplastic polyurethanes, polyester amides, polyether amides, thermoplastic copolyester elastomers and polyolefin alloys with elastomers are known (Rader, C., Kunststoffe 83 (1993) 10, 777–781; Kunststoffe 86 (1996) 12, 1845–1851).

The special advantage of polyolefin alloys with elastomers as thermoplastic elastomers lies in the easy processability and the advantageous recycling properties of these products.

The material properties of thermoplastic elastomers based on polyolefin alloys with elastomers, such as strength and elasticity, are determined by the composition of the polyolefin component and the elastomeric component and the distribution of the elastomeric component in the polyolefin component (Moore, P., Polypropylene Handbook, Carl Hanser-Verlag, Munich 1996, 218–225).

Known elastomeric components for thermoplastic elastomers based on polypropylene are ethylene-propylene elastomers (EP 672 712; EP 614940), ethylene-propylene-diene elastomers (EP 547 843; EP 409542), ethylene-vinyl acetate copolymers (BE 899507; Coran, A., Rubber Chem. Technol. 54 (1981), 892), chlorosulfinated polyethylene (U.S. Pat. No. 4,141,878), elastomeric copolymers of ethylene and $C_4$–$C_8$ olefins, such as elastomeric ethylene-butene copolymers, ethylene-hexene copolymers, ethylene-octene copolymers (Yamaguchi, M., J. Appl. Polymer Sci. 62 (1996), 87–97; 63 (1997), 467–474; Yu, T., J. Plastic Film & Sheeting 10 (1994) 1, 539–564), as well as elastomeric, atactic polypropylenes (EP 334 829) in amounts of 35 to 70% by weight, based on the polyolefin mixture.

Furthermore, the vulcanization of elastomeric components in polyolefin alloys based on polypropylene/ethylene-propylene-diene elastomers, by the addition of dodecyl mercaptan (DE 26 20 820), sulfur (EP 336780) or tetrabutylthiuram disulfide (EP 376 213) is known. However, these formulations have the disadvantage of a strong discoloration, so that semi-finished products and molded objects of these materials can be used only when dyed black.

Furthermore, for the preparation of thermoplastic elastomers by compounding polypropylene with ethylene-propylene-diene elastomers, the use of thermally decomposing free radical-forming agents, such as azo compounds (U.S. Pat. No. 5,079,283) or peroxides (U.S. Pat. No. 5,459,201; Kim, Y., Polymer Engn. Sci. 35 (1995) 20, 1592–1594; BE 841507) or of thermally decomposing free radical-forming agents in combination with divinyl compounds, such as divinylpyridine (J 88 067 802) or divinylbenzene (U.S. Pat. No. 4,912,148, EP 311451), is also known.

For formulations of polypropylenes and elastomeric ethylene-hexene copolymers, the modification of the blends by electron irradiation is known (JP 96 301 927).

Thermoplastic elastomers are also known as ternary blends of polyethylenes, polypropylenes and ethylene-propylene-diene elastomers (EP 699522; Kim, J. Applied Polymer Sci. 60 (1996), 2199–2206).

Thermoplastic elastomers of good dyeability and high elasticity can be achieved by means of these formulations. However, high strength requirements are not fulfilled.

Impact-resistant polymer blends of polyolefins and elastomers are known. Known impact-resistant components for polypropylene are amorphous ethylene-propylene-diene elastomers (Michaeli, W., Kunststoffberater (1990) 3, 38–43; Kloos, F., Angewandte Makromelekulare Chemie 185/186 (1991), 97–108), ethylene-propylene elastomers (Kim, B., J. Applied Polymer Sci. 60 (1996), 2207–2218, J. Applied Polymer Sci. 60 (1996), 1391–1403), also in the form of reactor blends of polypropylene and ethylene-propylene rubber (Kresge, E., Macromol. Symp. 53 (1992), 173–189, Schwager, H., Kunststoffe 82 (1992) 6, 499–501), butadiene-α-methylstyrene rubber (Natov, M., Plaste u. Kautschuk 38 (1991) 3, 85–88), styrene-butadiene block copolymers (Karger-Kocsis, J., Kunststoffe 74 (1984), 104–107), elastomeric copolymers of ethylene and higher molecular weight $C_4$–$C_8$ olefins (Yu, T., ANTEC 94, 2439–2441; Meiske, L., ANTEC 96, 2001–2005) and elastomeric ethylene-vinyl acetate copolymers (Gupta, A., J. Applied Polymer Sci. 45 (1992), 1303–1312) in amounts of 10 to 35% by weight, based on the polyolefin mixture.

The limited compatibility of the impact-resistant components is a disadvantage of these unmodified blends.

DETAILED DESCRIPTION OF THE INVENTION

The object of the present invention was the development of thermoplastic elastomers, which at the same time have a high strength, a high elasticity and good dyeability, as well as the high impact-resistant polymer blends produced therefrom.

Surprisingly, it was found that, by compounding propylene homopolymers and/or propylene copolymers with elastomers with addition of readily volatile $C_4$ to $C_7$ dienes, optionally in the presence of thermally decomposing free radical-forming agents, thermoplastic elastomers with a very finely dispersed distribution of elastomeric components in the polyolefin component are formed and fulfill these requirements.

The object of the invention was accomplished by thermoplastic elastomers of high strength, high elasticity and good dyeability, the incorporated elastomeric particles of which have an average particle diameter of 0.05 to 5 μm and preferably of 0.1 to 1 μm, of propylene homopolymers and/or propylene copolymers, elastomeric $C_2$ to $C_8$ olefin copolymers and/or terpolymers, multifunctional, unsaturated monomers, optionally thermally decomposing free radical-forming agents and auxiliary materials, the thermoplastic elastomers being produced by a method, for which mixtures of 20 to 80% by weight and preferably of 40 to 60% by weight of propylene homopolymers and/or propylene copolymers, 80 to 20% by weight and preferably 60 to 40% by weight of elastomeric $C_2$ to $C_8$ olefin copolymers and/or terpolymers, 0.10 to 4.0% by weight and preferably 0.2 to 1.5% by weight, based on the total of the polymers used, of readily volatile $C_4$ to $C_7$ dienes and 0 to 4.0% by weight and preferably 0.2 to 1.5% by weight, based on the total of the polymers used, of acyl peroxides, alkyl peroxides, hydroperoxides, peroxycarbonates, peresters, ketone peroxides, peroxyketals and/or azo compounds as thermally decomposing free radical-forming agents are reacted in the melt and, before and/or after the reaction, 0.01 to 40% by weight, based on the total of the polymers used, of auxiliary materials being possibly added.

The finely dispersed distribution of the elastomeric components in the polyolefin component, which lies in the $\mu$m range in the case of the inventive thermoplastic elastomers, can be determined by transmission electron microscopic photographs.

Pursuant to the invention, the propylene homopolymers preferably are largely isotactic propylene homopolymers, especially isotactic propylene homopolymers, which were synthesized using Ziegler-Natta catalysts or metallocene catalysts. Especially suitable in this connection are propylene homopolymers with a bimodal distribution of molecular weights, weight average molecular weights $M_w$ of 500,000 to 1,500,000 g/mole, number average molecular weights $M_n$ of 25,000 to 100,000 g/mole and $M_w/M_n$ values of 5 to 60, which were synthesized in a reactor cascade.

Copolymers of propylene and $\alpha$-olefins with 2 or 4 to 18 carbon atoms, especially random propylene copolymers, propylene block copolymers and/or random propylene block copolymers are also preferred for the inventive thermoplastic elastomers.

Mixtures of 50 to 98% by weight of largely isotactic propylene homopolymers and/or copolymers of propylene and ol-olefins with 2 or 4 to 18 carbon atoms and 2 to 50% by weight of non-isotactic propylene homopolymers, largely amorphous propylene homopolymers and/or propylene copolymers and/or nonlinear, modified propylene homopolymers and/or propylene copolymers also represent a preferred variation of propylene homopolymers and/or propylene copolymers for the inventive thermoplastic elastomers.

The non-isotactic propylene homopolymers, which optionally may be contained in the inventive thermoplastic elastomers, are elastomeric high molecular weight propylene homopolymers with a melting point of 145° C. to 165° C., a melt viscosity of 200,000 to 2,000,000 cps at 190° C., a heat of crystallization of 4 to 10 calories/g and a 35% to 55% by weight solubility in diethylether. The products described in EP 475 307 or EP 475 308 are examples of these non-isotactic polypropylene homopolymers.

The largely amorphous propylene homopolymers and/or propylene copolymers, which optionally may be contained in the inventive thermoplastic elastomers, contain less than 10% by weight of crystalline polypropylene or crystalline propylene copolymer, have an enthalpy of melting of less than 40 J/g and a melt index of 0.1 to 100 g/10 min at 230° C./2.16 kg, the largely amorphous polypropylene being a homopolymer of propylene and/or a copolymer of propylene of at least 80 mole percent of propylene and not more than 20 mole percent of one or several $\alpha$-olefins of the general formula $CH_2=CHR$, in which R is a linear or branched alkyl group with 2 to 8 carbon atoms. These amorphous polypropylene homopolymers and/or propylene copolymers are, in particular, stereo block propylene homopolymers and/or propylene copolymers, which are synthesized, for example, using highly active Ziegler-Natta catalysts, fixed on a metal oxide (Collette, J., Macromolecules 22 (1989), 3851–3858; DE 2830160) or soluble Ziegler-Natta catalysts (de Candia, F., Makromol. Chem. 189 (1988), 815–821), optionally with subsequent reactive modification (EP 636863) and/or degradation (EP 640 850).

The nonlinear, modified, propylene homopolymers and/or propylene copolymers, which may optionally be contained in the inventive thermoplastic elastomers have melt indexes of 0.1 to 30 g/10 min at 230° C./2.16 kg and a ratio of the intrinsic viscosity of the nonlinear, modified propylene homopolymer and/or propylene copolymer to the limiting viscosity of the linear propylene homopolymer and/or propylene copolymer with largely the same weight average molecular weight of 0.20 to 0.99. These nonlinear, modified propylene homopolymers and/or propylene copolymers are synthesized by free radical coupling reactions (modification of propylene homopolymers and/or propylene copolymers with ionizing radiation or thermally decomposing free radical-forming agents, optionally with addition of multifunctional, ethylenically unsaturated monomers) or by polymer-like reactions of functionalized propylene homopolymers and/or propylene copolymers.

Examples of these nonlinear modified propylene homopolymers and/or propylene copolymers, produced by free radical coupling reactions are, in particular:

modified propylene homopolymers and/or propylene copolymers by reaction of propylene homopolymers and/or propylene copolymers with bis maleimido compounds in the melt (EP 574 801; EP 574804), modified propylene homopolymers and/or propylene copolymers by treatment of propylene homopolymers and/or propylene copolymers with ionizing radiation in the solid phase (EP 190889; EP 634454), modified propylene homopolymers and/or propylene copolymers by treatment of propylene homopolymers and/or propylene copolymers with peroxides in the solid phase (EP 384431; DE 4340194) or in the melt (EP 142 724), modified propylene homopolymers and/or propylene copolymers by treatment of propylene homopolymers and/or propylene copolymers with multifunctional ethylenically unsaturated monomers under the action of ionizing radiation (EP 678 527), modified propylene homopolymers and/or propylene copolymers by treatment of propylene homopolymers and/or propylene copolymers with multifunctional ethylenically unsaturated monomers in the presence of peroxides in the melt (EP 688817; EP 450342).

Furthermore, as nonlinear, modified propylene homopolymers and/or propylene copolymers, which optionally may be contained in the inventive thermoplastic elastomers, nonlinear, modified propylene homopolymers and/or propylene copolymers, which are synthesized by polymer-like reaction of functionalized propylene homopolymers and/or propylene copolymers, preferably of propylene homopolymers and/or propylene copolymers containing acid groups and/or acid anhydride groups, with multifunctional compounds of opposite reactivity, preferably with $C_2$ to $C_{16}$ diamines and/or with $C_2$ to $C_{16}$ diols, are preferred.

Examples of nonlinear, modified propylene homopolymers and/or propylene copolymers, produced by polymer-like reactions are, in particular:

modified propylene homopolymers and/or propylene copolymers by reaction of maleic anhydride-grafted propylene homopolymers and/or propylene copolymers with diamines or polyglycols (EP 177401; JP 08 176 365), modified propylene homopolymers and/or propylene copolymers by reaction of propylene homopolymers and/or propylene copolymers, containing acid or acid anhydride groups, with polymers containing epoxy, hydroxy or amino groups (EP 307684; EP 299486), Nonlinear, modified propylene homopolymers and/or propylene copolymers, which are synthesized by the hydrolytic condensation of propylene homopolymers and/or propylene copolymers, which contain hydrolyzable silane groups, represent a further, preferred variation of nonlinear, modified propylene homopolymers and/or propylene copolymers, which may be contained in the inventive thermoplastic elastomers. The products described in the German patent 4107635 or the U.S. Pat. No. 4,714,716 are examples of these.

Particularly advantageously, the propylene homopolymers and/or propylene copolymers of the inventive thermoplastic elastomers represent a multicomponent mixture of largely isotactic propylene homopolymers and/or of copolymers of propylene and ethylene or α-olefins with 4 to 18 carbon atoms, non-isotactic propylene homopolymers, largely amorphous propylene homopolymers and/or propylene copolymers, as well as nonlinear, modified propylene homopolymers and/or propylene copolymers.

By using special multi-component mixtures of the polypropylenes and propylene copolymers described, specific combinations of properties of the inventive thermoplastic elastomers can be achieved.

Preferably blends of
a) 60 to 98% by weight of a crystalline copolymer or 85 to 99.5% by weight of propylene and 15 to 0.5% by weight of ethylene and/or an α-olefin of the general formula $CH_2=CHR$, in which R is a linear or branched alkyl group with 2 to 8 carbon atoms, and
b) 2 to 40% by weight of an elastic copolymer of 20 to 70% by weight of ethylene and 80 to 30% by weight of propylene and/or an α-olefin of the general formula $CH_2=CHR$, wherein R is a linear or branched alkyl group with 2 to 8 carbon atoms,
are used as propylene copolymers in the inventive thermoplastic elastomers.

These polyolefin blends of crystalline copolymers and elastic copolymers are, for example, the polymer mixtures described in the EP 400 333 or EP 472 946.

The elastomeric $C_2$ to $C_8$ olefin copolymers and/or terpolymers, contained in the inventive thermoplastic elastomers, preferably are ethylene-propylene elastomers, ethylene-propylene-diene elastomers, ethylene-vinyl acetate copolymers, chlorosulfinated polyethylene, ethylene-styrene elastomers, elastomeric copolymers of ethylene and $C_4$ to $C_8$ olefins—especially elastomeric ethylene-butene copolymers, ethylene-hexene copolymers and/or ethylene-octene copolymers—elastomeric butadiene-styrene copolymers and/or terpolymers—especially styrene-ethylene-butadiene-styrene block copolymers and/or styrene-isoprene copolymers and/or terpolymers.

The readily volatile $C_4$ to $C_7$ dienes, which are reacted with the mixtures of propylene homopolymers and/or propylene copolymers and elastomeric $C_2$ to $C_8$ olefin copolymers and/or olefin terpolymers, preferably are butadiene, chloroprene, cyclohexadiene, cyclopentadiene, dimethylbutadiene, heptadiene, hexadiene, isoprene and/or 1,4-pentadiene.

The auxiliary materials, contained in the inventive, thermoplastic elastomers, preferably are 0.01% to 2.5% by weight of stabilizers, 0.05% to 2% by weight of nucleating agents, 0.1% to 1% by weight of antistatic agents, 0.2% to 3% by weight of pigments, 3% to 40% by weight of fillers, 1% to 20% by weight of flame retardants, 3% to 40% by weight of reinforcing agents and/or 0.01% to 5% by weight, in each case based on the total weight of the polymers used, of processing aids.

The stabilizers, contained in the inventive thermoplastic elastomers preferably are mixtures of 0.01% to 0.6% by weight of phenolic antioxidants, 0.01% to 0.6% by weight of 3-arylbenzofuranones, 0.01% to 0.6% by weight of processing stabilizers based on phosphites, 0.01% to 0.6% by weight of high temperature stabilizers based on disulfides and thioethers and/or 0.01% to 0.8% by weight of sterically hindered amines (HALS).

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol,2,2'-methylene-bis(6-t-butyl-4-methylphenol), 4,4'-thio-bis-(6-t-butyl-2-methylphenol), octadecyl3(3,5-di-t-butyl-4-hydroxyphenyl) propionate, 1,3,5-trimethyl-2,4,6-tris(3',5'-di-t-butyl-4-hydroxybenzyl)benzeneand/or pentaerythritol-tetrakis(3-(3, 5-di-t-butyl-4-hydroxyphenyl)) propionate.

As benzofuranone derivative, 5,7-di-t-butyl-3-(3,4-dimethylphenyl)-3H-benzofuran-2-one, in particular, is suitable.

As HALS compounds, bis-2,2,6,6-tetramethyl-4-piperidyl sebacate and/or poly-((1,1,3,3-tetramethylbutyl)-imino)-1,3,5-triazine-2,4-diyl)(2,2,6,6-tetramethylpiperidyl)-amino)-hexamethylene-4-(2,2,6,6-tetramethyl)piperidyl)-imino) are particularly suitable.

The nucleating agents, optionally contained in the inventive, thermoplastic elastomers, preferably are α-nucleating agents, such as talcum, sodium benzoate or the sodium salt of methylene-bis(2,4-di-t-butylphenol) phosphoric acid or β-nucleating agents, such as adipic acid dianilide, quinacridonequinone and/or N,N'-dicyclododecyl-4,4-biphenyldicarboxamide.

The fillers, optionally contained in the inventive, thermoplastic elastomers, preferably are $Al_2O_3$, $Al(OH)_3$, barium sulfate, calcium carbonate, glass beads, wood flour, silica, hollow microspheres, carbon black, talcum and/or wollastonite. The reinforcing agents, optionally contained in the inventive thermoplastic elastomers, preferably are aramide fibers, cellulose fibers, flax, jute, kenaf, fiberglass, glass mats, microfibers of liquid crystalline fibers and/or polytetrafluoroethylene fibers.

Calcium stearate, magnesium stearate and/or waxes may be contained in the inventive, thermoplastic elastomers as processing aids.

Furthermore, high impact-resistant polymer blends, which consist of
a) 5 to 95% by weight and preferably 10 to 50% by weight of thermoplastic elastomers of one or several of the claims 1 to 5 and
b) 95 to 5% by weight and preferably 90 to 50% by weight of
b1) non-modified polyolefins, preferably of largely isotactic propylene homopolymers, copolymers of propylene and ethylene or α-olefins with 4 to 18 carbons atoms, especially random propylene copolymers, propylene block copolymers and/or random propylene block copolymers, non-isotactic propylene homopolymers, largely amorphous propylene homopolymers and/or propylene copolymers, nonlinear propylene homopolymers and/or propylene copolymers, and/or
b2) blends of
b2.1) 60 to 98% by weight of a crystalline copolymer of 85 to 99.5% by weight of propylene and 15 to 0.5% by weight of ethylene and/or an α-olefin of the general formula $CH_2=CHR$, wherein R is a linear or branched alkyl group with 2 to 8 carbon atoms b2.2) 2 to 40% by weight of an elastic copolymer of 20 to 70% by weight of ethylene and 80 to 30% by weight of propylene and/or an α-olefin of the general formula $CH_2=CHR$, wherein R is a linear or branched alkyl group with 2 to 8 carbon atoms, are inventive.

The unmodified polyolefin components in the inventive polymer blends of high impact resistance consist preferably of those propylene homopolymers and/or propylene copolymers, which are also a component of the thermoplastic elastomers.

The thermoplastic elastomers of high strength, elasticity and good dyeability, the incorporated elastomeric particles of which have an average particle diameter of 0.05 to 5 μm and preferably of 0.1 to 1 μm, from propylene homopolymers and/or propylene copolymers, elastomeric $C_2$ to $C_8$ olefin copolymers and/or terpolymers, multifunctional, unsaturated monomers, optionally thermally decomposing free radical-forming agents and auxiliary materials are synthesized pursuant to the invention by a method, for which mixtures of 20 to 80% by weight and preferably of 40 to 60% by weight of propylene homopolymers and/or propylene copolymers, 80 to 20% by weight and preferably 60 to 40% by weight of elastomeric $C_2$ to $C_8$ olefin copolymers and/or terpolymers, 0.10 to 4.0% by weight and preferably 0.2 to 1.5% by weight, based on the total of the polymers used, of readily volatile $C_4$ to $C_7$ dienes and 0 to 4.0% by weight and preferably 0.2 to 1.5% by weight, based on the total weight of the polymers used, acyl peroxides, alkyl peroxides, hydroperoxides, peroxycarbonates, peresters, ketone peroxides, peroxyketals and/or azo compounds as thermally decomposing free-radical forming agents are reacted in continuous kneaders in the melt at mass temperatures of 150° C. to 300° C. and preferably of 185° C. to 245° C. and residence times of 1 to 35 minutes and preferably of 2.5 to 6 minutes, 0.01 to 40% by weight, based on the sum of the polymers used, of auxiliary materials being added before and/or after the reaction.

As thermally decomposing free radical-forming agents for the inventive method of preparing thermoplastic elastomers, acyl peroxides, alkyl peroxides, hydroperoxides, peroxycarbonates, peresters, ketone peroxides, peroxyketals and/or azo compounds are used.

Examples of the acyl peroxides used are benzoyl peroxide, chlorobenzoyl peroxide, methoxybenzoyl peroxide, methylbenzoyl peroxide, nitrobenzoyl peroxide, acetylbenzoyl peroxide, lauroyl peroxide or succinoyl peroxide.

Examples of the alkyl peroxides used are allyl-t-butyl peroxide, 2,2-bis(t-butylperoxybutane), 1,1-bis-(t-butylperoxy)-3,3,5-trimethylcyclohexane, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(tamylperoxy)cyclohexane, t-amyl peroxide, t-butylcumyl peroxide, t-butyl peroxide and/or 1-hydroxybutyl-n-butyl peroxide.

Examples of hydroperoxides used are decalin hydroperoxide and tetralin hydroperoxide.

Examples of peresters and peroxy carbonates used are butyl peracetate, cumyl peracetate, cumyl perpropionate, cyclohexyl peracetate, di-t-butyl peradipate, di-t-butyl perazelate, di-t-butyl perglutarate, di-t-butyl perphthalate, di-t-butyl persebacate, 4-nitrocumyl perpropionate, 1-phenylethyl perbenzoate, phenylethyl nitroperbenzoate, t-butyl-bicyclo-(2,2,1)-heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcycl opropane percarboxylate, t-butyldimethyl percinnamate, t-butyl-2-(2, 2-diphenylvinyl) perbenzoate, t-butyl-4-methoxy perbenzoate, t-butylperbenzoate, t-butylcarboxycyclohexane, t-butyl pemaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succinimido percarboxylate, t-butyl percrotonoate, t-butyl permaleic acid, t-butyl permethacrylate, t-butyl peroctoate, t-butyl peroxyisopropylcarbonate, t-butyl perisobutyrate, t-butyl peracrylate and t-butyl perpropionate;

Examples of ketone peroxides used are methyl ethyl ketone hydroperoxide and diethyl ketone hydroperoxide.

Examples of peroxyketals used are 1,1-di-t-butylperoxy-3,3,5-trimethylcyclohexane and 1,1-di-t-butylperoxy-3,3,5-dimethylethylcyclohexane.

Examples of azo compounds used are 2-cyano-2-propylazoformamide, 2,2'-azo-bis-2-methylpropionitrile, 1,1'-azo-bis-cyclopentane nitrile, 1,1'-azo-biscyclohexane nitrile, 2,2'-azo-bis-cyclohexyl propionitrile, 2,2'-azo-bis-methyl-2-methyl propion ate and azo-bis-(N,N'-diethyleneisobutyramidine).

Especially twin-screw extruders, single-screw extruders of high mixing action or a cascade of coupled kneading chambers are suitable as continuous kneaders for the inventive method of producing thermoplastic elastomers.

Pursuant to the invention, a preferred variation for the metered addition of the readily volatile $C_4$ to $C_7$ dienes and/or acyl peroxides, alkyl peroxides, hydroperoxides, peroxycarbonates, peresters, ketone peroxides, peroxyketals and/or azo compounds as thermally decomposing free radical-forming agents for the method of producing thermoplastic elastomers consists therein that the metered addition takes place in continuous kneaders in the melt of the mixture of propylene homopolymers and/or propylene copolymers, elastomeric $C_2$ to $C_8$ olefin copolymers and/or terpolymers and optionally auxiliary materials, readily volatile $C_4$ to $C_7$ dienes and/or thermally decomposing free radical-forming agents.

A preferred variation for the preparation of mixtures of propylene homopolymers and/or propylene copolymers, elastomeric $C_2$ to $C_5$ olefin copolymers and/or terpolymers and optionally auxiliary materials with readily volatile $C_4$ to $C_7$ dienes and/or acyl peroxides, alkyl peroxides, hydroperoxides and/or peresters as thermally decomposing free radical-forming agents for the method of producing thermoplastic elastomers consists, pursuant to the invention, also therein that the mixing of the propylene homopolymers and/or propylene copolymers, elastomeric $C_2$ to $C_8$ olefin copolymers and/or terpolymers and optionally auxiliary materials with the readily volatile $C_4$ to $C_7$ dienes and/or thermally decomposing free radical-forming agents takes place by premixing and/or absorption from the gas phase in continuous flow-through mixers before the metered addition of the mixtures into the continuous kneader.

For the premixing or absorption of the thermally decomposing free radical-forming agents, those acyl peroxides, alkyl peroxides, hydroperoxides, peroxycarbonates, peresters, ketone peroxides, peroxyketals and/or azo compounds are used, which have a half life of more than 40 seconds at the melting point or softening point of the propylene homopolymers and/or propylene copolymers used, in order to preclude premature decomposition before the homogenization of the mixture.

The inventive thermoplastic elastomers, as well as mixtures of thermoplastic elastomers with conventional polyolefins are suitable preferably for use in the vehicle industry, especially for hose connectors, air intake ducts, pipe seals and scaling profiles, in the household appliances industry, especially for connectors and sealing profiles, in the building sector, especially for window seals, sealing profiles for partitions, expansion joints and in the installation sector, as well as in medical technology, particularly for tubes, seals, syringes and pistons.

It is of particular advantage that, because of their opaque coloration, the thermoplastic elastomers can be dyed to any color shade for the manufacture of colored products.

The invention is explained by the following Examples.

EXAMPLE 1

Into a Werner-Pfleiderer ZSK 54 twin-screw extruder, with an L/D of 36, 2 scales for the metered addition, equipment for the metered addition of liquid media to zone 4, vacuum degassing and underwater granulation, a temperature profile of 80°/170°/220°//180°/220°/220°/210°/190° C., a propylene-ethylene copolymer (ethylene content of 4.2% by weight, a melt index of 8 g/10 min at 230° C./2.16 kg) is added at the rate of 8.0 kg/hour and an ethylene-octene copolymer (with an octene content of 24% by weight, a melt index of 5 g/10 min at 190° C./2.16 kg) is added at the rate of 12.0 kg/hour. The mixture is melted in the extruder and a mixture of 32% by weight of isoprene, 18% by weight of 2,5-dimethyl-2,5-di(t-butylperoxyhexane) and 50% by weight of acetone is added at the rate of 0.6 kg/hour to zone 4 of the extruder. The reaction mixture is subjected to a vacuum degassing, discharged and granulated.

The resulting opaque, thermoplastic elastomer has the following properties:

tensile stress (N/mm$^2$) at an elongation (%): 7.5/200, 9/400, 13.5/600 tensile strain: 25%

EXAMPLE 2

Into a Werner-Pfleiderer twin-screw extruder of Example 1, a propylene-ethylene copolymer of Example 1 and an ethylene-octene copolymer of Example 1 are added each at the rate of 10.0 kg/hour. The mixture is melted in the extruder and a mixture of 40% by weight of butadiene, 10% by weight of dicumyl peroxide and 50% by weight of acetone is added at the rate of 0.65 kg/hour to zone 4 of the extruder.

The resulting, opaque, thermoplastic elastomer has the following properties:

tensile stress (N/mm$^2$) at an elongation (%): 8.2/200, 10.2/400, 15.5/600 tensile strain: 30%

For comparison, the thermoplastic elastomer, produced under the same conditions without the addition of the mixture of butadiene, dicumyl peroxide and acetone has a tensile strength of 9 M/mm$^2$ at an elongation at break of 42%.

A thermoplastic elastomer, produced under the same experimental conditions without the addition of butadiene, has the following properties:

tensile stress (N/mm$^2$) at an elongation (%): 7.3/200, 8.1/400, 10.9/600 tensile strain: 29%.

EXAMPLE 3

To a Werner & Pfleiderer twin-screw extruder of Example 1, having a temperature profile of 80°/170°/230°//190°/230°/230°/220°/190° C., a polypropylene compound, which consists of 99.3% by weight of a reactor blend (with an ethylene content of 33 mole percent, a melt index of 8 g/10 min at 230° C./2.16 kg), consisting of a propylene-ethylene copolymer, and an elastic ethylene-propylene copolymer, 0.35% by weight of 2-t-butyl-4,6-diisopropylphenol, 0.15% by weight of bis-2,2,6,6-tetramethyl-4-piperidyl sebacate and 0.2% by weight of calcium palmitate is added at the rate of 8.0 kg/hour and an ethylene-octene copolymer of example 1 is added at the rate of 12 kg/hour. The mixture is melted in the extruder and a mixture of 15% by weight of butadiene, 10% by weight of dimethylbutadiene, 15% by weight of 1-phenylethyl perbenzoate, 10% by weight of dicumyl peroxide and 50% by weight of acetone is added at the rate of 0.55 kg/hour. The reaction mixture is subjected to vacuum degassing, discharged and granulated.

The resulting opaque, thermoplastic elastomer has the following properties:

tensile stress (N/mm$^2$) at an elongation (%): 6.5/200, 8.8/400, 12.5/600 tensile strain: 16.25%

For comparison, the thermoplastic elastomer, prepared under the same conditions without the addition of the mixture of diene monomers, thermally decomposing free radical-forming agents and acetone, has the following properties:

tensile stress (N/mm$^2$) at an elongation (%): 2.8/200, 3.0/400, 3.6/600 tensile strain: 23.8%

A thermoplastic elastomer, produced under the same experimental conditions without the addition of diene monomers, has the following properties:

tensile stress (N/mm$^2$) at an elongation (%): 5.0/200, 6.5/400, 7.7/600 tensile strain: 21.2%

EXAMPLE 4

To a Werner & Pfleiderer twin-screw extruder of Example 1, having 3 scales for metered addition, a temperature profile of 80°/175°/220°//190°/230°/230°/220°/190° C., a polypropylene compound of Example 3 is added at a rate of 7.0 kg/hour, a nonlinear, modified propylene homopolymer (with a melt index of 1.9 g/10 min at 230° C./2.16 kg, a butadiene content of 0.9% by weight and a ratio of the intrinsic viscosity of the nonlinear modified propylene homopolymer to the intrinsic viscosity of the unmodified propylene homopolymer of 0.82) is added a rate of 1.2 kg/hour and an ethylene-octene copolymer of Example 1 is added a rate of 12 kg/hour. The mixture is melted in the extruder and a mixture of 15% by weight of isoprene, 10% by weight of cyclopentadiene, 15% by weight of t-butyl pertoluate, 10% by weight of t-butyl cumyl peroxide and 50% by weight of acetone is added at the rate of 0.35 kg/hour. The reaction mixture is subjected to vacuum degassing, discharged and granulated.

The resulting opaque, thermoplastic elastomer has the following properties:

tensile stress (N/mm$^2$) at an elongation (%): 6.9/200, 8.3/400, 11.2/600 tensile strain: 15.25%

For comparison, the thermoplastic elastomer, prepared under the same conditions without the addition of the mixture of diene monomers, thermally decomposing free radical-forming agents and acetone, has the following properties:

tensile stress (N/mm$^2$) at an elongation (%): 3.3/200, 3.5/400, 3.6/600 tensile strain: 23.8%

A thermoplastic elastomer, produced under the same experimental conditions without the addition of diene monomers, has the following properties:

tensile stress (N/mm$^2$) at an elongation (%): 4.7/200, 5.9/400, 6.8/600 tensile strain: 22.2%

EXAMPLE 5

To a Werner & Pfleiderer twin-screw extruder of Example 1, having 2 scales for metered addition, a temperature profile of 80°/175°/220°//190°/225°/230°/220°/190° C., a polypropylene compound of Example 3 is added at a rate of 8.0 kg/hour and a talcum-powdered ethylene-propylene-ethylidene norbornene terpolymer (with a melt index of 0.5 g/10 min at 230° C./2.16 kg, a propene content of 24% by weight, 2.6 double bonds per 1000 carbon atoms) is added at the rate of 12 kg/hour. The mixture is melted in the extruder and a mixture of 10% by weight of butadiene, 5% by weight of hexadiene, 5% by weight of diethylketone hydroperoxide, 25% by weight of dicumyl peroxide and 55% by weight of acetone is added at 0.62 kg/hour. The reaction mixture is subjected to vacuum degassing, discharged and granulated.

The resulting opaque, thermoplastic elastomer has the following properties:

tensile stress (N/mm$^2$) at an elongation (%): 8.5/200, 13.2/400 tensile strain: 18.7%

For comparison, the thermoplastic elastomer, prepared under the same conditions without the addition of the mixture of diene monomers, thermally decomposing free radical-forming agents and acetone, has the following properties:

tensile stress (N/mm$^2$) at an elongation (%): 3.1/200, 3.8/400 tensile strain: 25.0%

A thermoplastic elastomer, produced under the same experimental conditions without the addition of diene monomers, has the following properties:

tensile stress (N/mm$^2$) at an elongation (%): 5.5/200, 7.4/400 tensile strain: 18.5%

EXAMPLE 6

To a Werner & Pfleiderer twin-screw extruder of Example 1, having 2 scales for metered addition, a temperature profile of 80°/175°/220°//190°/225°/230°/220°/190° C., a polypropylene compound of Example 3 is added at a rate of 10.0 kg/hour and a talcum-powdered ethylene-propylene-ethylidene norbornene terpolymer of Example 5 is added at the rate of 10.0 kg/hour. The mixture is melted in the extruder and a mixture of 20% by weight of isoprene, 5% by weight of hexadiene, 5% by weight of decalin hydroperoxide, 20% by weight of dicumyl peroxide and 50% by weight of acetone is added at the rate of 0.60 kg/hour to zone 4 of the extruder. The reaction mixture is subjected to a vacuum degassing, discharged and granulated.

The resulting opaque, thermoplastic elastomer has the following properties:

tensile stress (N/mm$^2$) at an elongation (%): 8.0/200, 12.5/400 tensile strain: 22.5%

For comparison, the thermoplastic elastomer, prepared under the same conditions without the addition of the mixture of diene monomers, thermally decomposing free radical-forming agents and acetone, has the following properties:

tensile stress (N/mm$^2$) at an elongation (%): 4.8/200, 7.7/400 tensile strain: 25.0%

A thermoplastic elastomer, produced under the same experimental conditions without the addition of diene monomers, has the following properties:

tensile stress (N/mm$^2$) at an elongation (%): 6.1/200, 8.5/400 tensile strain: 26.4%

EXAMPLE 7

In a continuous flow-through mixer, 2% by weight, based on the polymer mixture, of a 25% solution of 2,5-dimethyl-2,5-di(t-butyl peroxyhexane) in acetone is drummed onto a mixture of 40% by weight of a powdery ethylene-propylene copolymer (with an ethylene content of 4.2% by weight, a melt index of 8 g/10 min at 230° C./2.16 kg) and 60% by weight of a finely divided, talcum-powdered ethylene-propylene-ethylidene norbornene terpolymer (with a melt index of 0.6 g/10 min at 230° C./2.16 kg, a propene content of 26% by weight and three double bonds per 1000 carbon atoms). Subsequently, the polymer mixture, charged with the thermally decomposing free-radical forming agent, is transferred to a continuous screw mixer and, during a residence time of 12 minutes at 45° C. in contact with a cycling gas consisting of 28% by volume of butadiene and 72% by volume of nitrogen, charged absorptively with 1.1% by weight of butadiene, based on the polymer mixture. After the metered addition to a Berstorff Z25 twin-screw extruder, the polymer mixture, laden with thermally decomposing free-radical forming agent and diene, is melted at 250 rpm at a throughput of 5 kg per hour and a temperature profile of 25/165°/160°/160°/175°/190°/230°/235°/240°/240° C., homogenized, discharged and granulated.

The resulting opaque, thermoplastic elastomer has the following properties:

melt index: 0.06 g/10 min at 230° C./2.16 kg

Heat of fusion: 63 J/g crystallization temperature: 370° K tensile stress (N/mm$^2$) at an elongation (%): 7.5/200, 11.2/400, 25.1/600 tensile strain: 21%

For comparison, the polymer mixture, prepared under the same conditions without pretreatment with thermally decomposing free radical-forming agents and diene, has the following properties:

melt index: 0.86 g/10 min at 230° C./2.16 kg

Heat of fusion: 47 J/g crystallization temperature: 372° K tensile stress (N/mm$^2$) at an elongation (%): 3.1/200, 4.2/400, 5.4/600 tensile strain: 21%

The polymer mixture, prepared under the same conditions in the continuous screw mixer with premixing with thermally decomposing free radical-forming agents but without diene absorption has, for comparison, the following properties:

melt index: 0.15 g/10 min at 230° C./2.16 kg

Heat of fusion: 68 J/g crystallization temperature: 373° K tensile stress (N/mm$^2$) at an elongation (%): 7.9/200, 9.8/400, 14.8/600 tensile strain: 21%

EXAMPLE 8

In a continuous flow-through mixer, 2% by weight, based on the polymer mixture, of a 25% solution of 1,1-di(t-butylperoxy)-3,3,5-trimethylcyclohexane in acetone is drummed onto a mixture of 40% by weight of a powdery ethylene-propylene copolymer (with an ethylene content of 4.2% by weight, a melt index of 8 g/10 min at 230° C./2.16 kg) and 60% by weight of a finely divided, talcum-powdered ethylene-propylene-ethylidene norbornene terpolymer (with a melt index of 0.6 g/10 min at 230° C./2.16 kg, a propene content of 28% by weight and three double bonds per 1000 carbon atoms). Subsequently, the polymer mixture, charged with the thermally decomposing free-radical forming agent, is transferred to a continuous screw mixer and, during a residence time of 8 minutes at 45° C. in contact with a cycling gas consisting of 32% by volume of isoprene and 68% by volume of nitrogen, charged absorptively with 0.7% by weight of isoprene, based on the polymer mixture. After the metered addition to a Berstorff Z25 twin-screw extruder, the polymer mixture, laden with thermally decomposing free-radical forming agent and diene, is melted at 250 rpm at a throughput of 5.2 kg per hour and a temperature profile of 25°/165°/160°/160°/175°/185°/225°/230°/240°/235° C., homogenized, discharged and granulated.

The resulting opaque, thermoplastic elastomer has the following properties:
melt index: 0.06 g/10 min at 230° C./2.16 kg
Heat of fusion: 64 J/g crystallization temperature: 376° K
tensile stress (N/mm$^2$) at an elongation (%): 6.9/200, 11.0/400, 20.7/600
tensile strain: 25%

EXAMPLE 9

In an extruder of Example 7, a polymer mixture of 70% by weight of a polypropylene homopolymer (with a melt index of 1.9 g/10 min at 230° C./2.16 kg) and 30% by weight of the thermoplastic elastomer of Example 7 is melted at 250 rpm at a throughput of 5 kg/hour and a temperature profile of 25°/215°/215°/215°/215°/215°/215°/220° C., homogenized, discharged and granulated.

The resulting impact-resistant, modified polypropylene has the following properties:
tensile stress (N/mm$^2$) at an elongation (%): 20.3/200, 21/400, 22/600
Charpy notch impact resistance (kJ/m$^2$) at (° C.): 43/20, 4.8/−20, 2.4/−40

For comparison, an impact-resistant modified polypropylene, which was prepared under the same homogenization conditions from 70% by weight of the polypropylene homopolymer and 30% by weight of the corresponding unmodified propylene polymer/elastomer mixture of Example 7, has the following properties:
tensile stress (N/mm$^2$) at an elongation (%): 19.4/200, 20.0/400, 22.7/600
Charpy notch impact resistance (kJ/m$^2$) at (° C.): 10.5/20, 3.2/−20, 2.0/−40

What is claimed is:

1. Thermoplastic elastomers of high strength, high elasticity and good dyeability, comprising propylene polymers and incorporated elastomeric particles of elastomeric $C_2$ to $C_8$ olefin copolymers with an average diameter ranging from 0.05 to 5 μm wherein the thermoplastic elastomers are prepared by a process from a mixture comprising
   (a) 40 to 60 percent by weight relative to total polymer, of a propylene polymer selected from the group consisting of propylene homopolymers, propylene copolymers and combinations thereof,
   (b) 60 to 40 percent by weight relative to total polymer, of an elastomeric polymer of $C_2$ to $C_8$ olefins selected from the group consisting of olefin copolymers, terpolymers and combinations thereof,
   (c) 0.2 to 1.5 percent by weight, relative to total polymer, of readily volatile $C_4$ to $C_7$ dienes,
   (d) 0.2 to 1.5 percent by weight, relative to total polymer, of thermally decomposing free radical-forming agents, selected from the group consisting of acyl peroxides, alkyl peroxides, hydroperoxides, peroxycarbonates, peresters, ketone peroxides, peroxyketals and azo compounds, and
   (e) 0.01 to 40 percent by weight, relative to total polymer, of auxiliary materials
by melting, reacting and removing the unreacted readily volatile $C_4$ to $C_7$ dienes from the produced thermoplastic elastomers.

2. The thermoplastic elastomers of claim 1, wherein the propylene copolymers are copolymers of propylene and ethylene or α-olefins with 4 to 18 carbon atoms selected from the group consisting of random propylene copolymers, propylene block copolymers and random propylene block copolymers.

3. The thermoplastic elastomers of claim 1 or 2, wherein the propylene copolymers are a polyolefin mixture with an $M_W/M_N$ ratio of 2 to 6 and a melt index of 1 to 40 g/10 min at 230° C./2. 16 kg, which consists of
   60 to 98 percent by weight of a crystalline copolymer of 85 to 99 percent by weight of propylene and 15 to 0.5 percent by weight of ethylene and/or an α-olefin of the general formula $CH_2$=CHR, R being a linear or branched alkyl group with 2 to 8 carbon atoms, and
   2 to 40 percent by weight of an elastic copolymer of 20 to 70 percent by weight of ethylene and 80 to 30 percent by weight of propylene and/or an α-olefin of the general formula $CH_2$=CHR, R being a linear or branched alkyl group with 2 to 8 carbon atoms.

4. The thermoplastic elastomers of claim 1 or 2, wherein the propylene polymers (a) are a polyolefin mixture of
   a1) 50 to 98 percent by weight of largely isotactic propylene homopolymers and propylene copolymers and 2 to 50 percent by weight of
   a2) non-isotactic propylene homopolymers with a melt index of 145° to 165° C., a melt viscosity in excess of 200,000 cps at 190° C., a heat of crystallization of 4 to 10 cal/g and a portion of 35 to 55 percent by weight soluble in diethyl ether,
   a3) largely amorphous polypropylenes or propylene copolymers with a proportion of crystalline polypropylene or crystalline propylene copolymer of less than 10 percent by weight, an enthalpy of melting of less than 40 J/g and a melt index of 0.1 to 100 g/10 min at 230° C./2.16 kg, the largely amorphous polypropylene being a homopolymer of propylene and/or a copolymer of propylene of at least 80 mole percent of propylene and at most 20 mole percent of one or more α-olefins of the general formula $CH_2$=CHR, wherein R is a linear or branched alkyl group with 2 to 8 carbon atoms, and/or
   a4) nonlinear, modified propylene homopolymers and/or propylene copolymers, with melt indexes of 0.1 to 30 g/10 min at 230° C./2. 16 kg and a ratio of the intrinsic viscosity of the linear propylene homopolymer and/or propylene copolymer with largely the same weight average molecular weight of 0.20 to 0.99.

5. The thermoplastic elastomers of claim 1 or 2, wherein the elastomeric polymers of a $C_2$ to $C_8$ olefin (b) are ethylene-propylene elastomers, ethylene-propylene-diene elastomers, ethylene-vinyl acetate copolymers, chlorsulfonated polyethylene, ethylene-styrene elastomers, elastomeric copolymers of ethylene and $C_4$ to $C_8$ olefins, elastomeric ethylene-butane copolymers, ethylene-hexane copolymers, ethylene-octane copolymers, elastomeric butadiene-styrene copolymers or terpolymers, styrene-ethylene-butadiene-styrene block copolymers and/or styrene-isoprene copolymers or terpolymers.

6. The thermoplastic elastomers of the claim 1, wherein the readily volatile $C_4$ to $C_7$ dienes (c) are butadiene, chloroprene, cyclohexadiene, cyclopentadiene, dimethylbutadiene, heptadiene, hexadiene, isoprene and/or 1,4-pentadiene.

7. A method for the preparation of thermoplastic elastomers of high strength, high elasticity and good dyeability, comprising propylene polymers and incorporated elastomeric particles of elastomeric $C_2$ to $C_8$ olefin copolymers with an average diameter ranging from 0.05 to 5 µm, wherein mixtures comprising (a) 40 to 60 percent by weight relative to total polymer, of a propylene polymer selected from the group consisting of propylene homopolymers, propylene copolymers and combinations thereof, (b) 60 to 40 percent by weight relative to total polymer, of an elastomeric polymer of $C_2$ to $C_8$ olefins selected from the group consisting of olefin copolymers, terpolymers and combinations thereof, (c) 0.2 to 1.5 percent by weight, relative to total polymer, of readily volatile $C_4$ to $C_7$ dienes, (d) 0.2 to 1.5 percent by weight, relative to total polymer, of thermally decomposing free radical-forming agents, selected from the group consisting of acyl peroxides, alkyl peroxides, hydroperoxides, peroxycarbonates, peresters, ketone peroxides, peroxyketals and azo compounds, are melted in continuous kneaders, reacted at mass temperatures of 185 to 245° C. and residence times of 2.5 min to 6 min, and unreacted readily volatile $C_4$ to $C_7$ dienes are removed from the produced thermoplastic elastomers, and (e) 0.01 to 40 percent by weight, relative to total polymer, of auxiliary materials can be added before and/or after the reaction.

8. The method for preparing thermoplastic elastomers of claim 7, wherein readily volatile $C_4$ to $C_7$ dienes (c) and thermally decomposing free radicalforming agents (d), selected from the group consisting of acyl peroxides, alkyl peroxides, hydroperoxides, peroxycarbonates, peresters, ketone peroxides, peroxyketals and azo compounds, are added in the continuous kneader to the melt of the mixture of propylene homopolymers and/or propylene copolymers (a), elastomeric polymers of $C_2$ to $C_8$ olefins (b) and auxiliary materials (e).

9. The method for preparing thermoplastic elastomers of claim 7, wherein the mixing of the propylene homopolymers and/or propylene copolymers (a), elastomeric polymers of $C_2$ to $C_8$ olefins (b) and auxiliary materials (e) with the readily volatile $C_4$ to $C_7$ dienes (c) and thermally decomposing free radical-forming agents (d), selected from the group consisting of acyl peroxides, alkyl peroxides, hydroperoxides, peroxycarbonates, peresters, ketone peroxides, peroxyketals and azo compounds, takes place by premixing and/or by absorption from the gas phase in continuous flow-through mixers before the metered addition of the mixtures to the continuous kneader.

10. An article for a vehicle which is a hose connector, air intake duct, pipe seal or sealing profile, or an article for a household appliance which is a connector or sealing profile, or an article for a building which is a window seal, a sealing profile for a partition or an expansion joint, or an article for medical use which is a tube, seal, syringe or piston, comprising a thermoplastic elastomer of claim 1, 2 or 6.

* * * * *